United States Patent
Oshima et al.

(10) Patent No.: US 6,505,695 B2
(45) Date of Patent: Jan. 14, 2003

(54) ELECTRIC VEHICLE

(75) Inventors: Hiroyasu Oshima, Ishikawa (JP); Yutaka Komeno, Ishikawa (JP); Tutomu Yamazaki, Ishikawa (JP); Masaaki Takase, Ishikawa (JP); Hiroyuki Yoshida, Ishikawa (JP); Yuuji Taniguchi, Tokyo (JP)

(73) Assignee: Kanazawa Institute of Technology, Ishikawa (JP)

( * ) Notice: Subject to any disclaimer, the term of this patent is extended or adjusted under 35 U.S.C. 154(b) by 0 days.

(21) Appl. No.: 09/859,643

(22) Filed: May 18, 2001

(65) Prior Publication Data

US 2002/0170764 A1 Nov. 21, 2002

(51) Int. Cl.$^7$ ................................................. B60K 1/00
(52) U.S. Cl. ....................... 180/65.5; 180/321
(58) Field of Search ................. 180/65.1, 234, 180/237, 238, 65.5, 321

(56) References Cited

U.S. PATENT DOCUMENTS

| | | | | | |
|---|---|---|---|---|---|
| 1,125,184 | A | * | 1/1915 | Schleicher | 180/23 |
| 2,791,438 | A | * | 5/1957 | Ruf | 180/234 |
| 3,785,325 | A | * | 1/1974 | Mycroft | 180/321 |
| 3,963,262 | A | * | 6/1976 | Estell | 180/321 |
| 5,609,220 | A | * | 3/1997 | Moriya et al. | 180/253 |

* cited by examiner

Primary Examiner—Kevin Hurley
(74) Attorney, Agent, or Firm—Rader, Fishman & Grauer PLLC

(57) ABSTRACT

An electric vehicle has two driving operation blocks with the same appearance that are provided at both the front and rear ends of the body of the vehicle symmetrically around a point. The vehicle employs a collapsible driver's seat. The vehicle has four driving and steering blocks. Each of the driving and steering blocks contains a wheel, a drive motor that rotates the wheel and a steering gear motor that changes the direction of the wheel. A service floor of the vehicle does not have a wall and a floor height is extremely low for easy access by a senior citizen or a person in a wheel chair.

16 Claims, 3 Drawing Sheets

ELECTRIC VEHICLE

TECHNICAL FIELD

The present invention relates to a type of electric vehicle, more particularly, a cart, that uses a rechargeable battery as a power source, and which runs in a hallway or corridor at a low speed and carries elderly people, people in wheelchairs or materials to be carried. The vehicle is used mainly inside buildings of, such as, medical and welfare facilities, and is allowed to enter into rooms or elevators of the facilities to support transportation.

BACKGROUND OF THE INVENTION

As society ages, the number of people, particularly, senior citizens and people in wheelchairs in medical and welfare facilities is increasing. In addition, the scale of medical and welfare facilities is increasing as well. Given these circumstances, medical and welfare facilities will require such vehicles that can move easily and at low speeds in order to help senior citizens and people in wheelchairs move around inside the medical and welfare facilities by carrying them or a variety of materials. However, in the past, no vehicle that adequately fulfilled those functions could be available.

SUMMARY OF THE INVENTION

Taking the above into consideration, the present invention is to improve existing electric vehicles with rechargeable batteries. In particular, the present invention is to provide such an indoor electric vehicle that allows senior citizens and people in wheelchairs to access the vehicle easily. Further, the present invention is to provide such a vehicle to achieve easy loading and unloading of packages or other materials within the building structure of medical and welfare facilities. The vehicle is further designed to move at a low speed in the medical and welfare facility and to help not only senior citizens and people in wheelchairs but also freight transportation.

For this type of vehicle, it was considered, in particular, that the following conditions are required.

The floor of the vehicle should be low.

It should be possible to change direction without making a U-turn in hallways with inadequate width.

It should be able to move sideways and to parallel park at a desired location.

It should have a wide service floor area in a limited floor area of the vehicle.

The vehicle itself should be able to use elevators.

The present invention is to fulfill the above-mentioned conditions and issues.

In the present invention, the "service floor area" means the floor area on the body base of the electric vehicle that the people who take the service or the freight can occupy.

In the present invention, the height of the service floor area of the vehicle is as low as possible and at the same time, in order to secure the maximum service floor area, the devices, parts and circuits arranged on the bottom of the body base are minimized, In addition, the steering gear system, drive system, driving operation panel, driver's seat and control circuit are arranged in a dispersed manner as driving operation blocks at the front and back edges of the body base. Moreover, in the present invention, in order to secure the service floor area, it does not employ a fixed driver's seat, but has a movable driver's seat. In addition, the rail of the driver's seat is supported so that it may rotate. The rail of the driver's seat may be raised when it is not in use, and may be lowered when it is in use, so that it minimizes any hindrance to usage of even edge parts of the service floor area.

In addition, in the present invention, in order to reverse the direction of the vehicle without a U-turn, driving operation blocks are arranged at front and rear ends of a body base of the vehicle. In order to make driving operation at either the front or rear end of the driving operation blocks identical or substantially identical, the appearance of the driving operation blocks is made identical or substantially identical, and the driving operation blocks are positioned symmetrically around a point.

Moreover, in the present invention, a four-wheel independent drive and four-wheel independent steering gear systems are employed so that the vehicle can be driven and moved smoothly and immediately toward any directions, including frontward or backward directions, various diagonal directions, and straight left or right directions. Each of the driving and steering blocks may have a wheel, a driving motor that rotates the wheel directly or with a interconnecting speed reducer, a steering motor that may shift the moving direction of the vehicle, a steering rotator that supports the wheel, the driving motor and the speed reducer, a set of steering gears located between the steering motor and the steering rotator to convert the rotation of the steering motor to steering rotation of the steering rotator.

In addition, in order to simplify the driving operation and avoid incorrect operations, the driving operation panel may include a lever that can direct the front/back movement and left/right movement and a switch that can switch positive/negative phase steering operations. When the lever is set to the "positive phase steering operation," the front wheel of the vehicle are rotated toward a first direction whereas rear wheels are rotated toward a second direction, which is opposite to the first direction, so that the vehicle may turn. When the lever is set to the "negative phase steering operation," the front wheels of a vehicle are rotated toward a first direction whereas rear wheels are rotated toward the same first direction, so that the vehicle may move diagonally or in parallel without turning.

Furthermore, in the present invention, to provide a smooth slope between the service floor and the floor of such as a building, the vehicle may have a flap that bridges the service floor and the building floor at either the right or left side of the body base or at both sides thereof.

Also, in the present invention, in order for the vehicle to climb up or down a route having various slope angles easily even though the height of the service floor is extremely low, the center portion of the body base between the front and rear ends may be convexed upward so as not to have the center portion of the body touch the floor. Alternatively, the center portion of the body may be in a foldable structure that can be convexed at least upward at he center portion. The foldable portion may have a supporting wheel.

PREFERRED EMBODIMENT OF THE INVENTION

The basic embodiment of the present invention is an electric vehicle that has a body base in which an extremely low service floor area is formed relative to the ground. The service floor does not have a side-wall and is provided with driving and steering blocks, that are essential parts for a four-wheel independent drive and four-wheel independent steering gear systems, at four corners of the service floor. In addition, on both ends of the body base in the front-rear directions, driving operation blocks that are identical or substantially identical at least in appearance or in shape are provided symmetrically around a point.

In another embodiment of the present invention, each of the driving and steering blocks includes, a wheel, a drive motor having a driving shaft that is directly, or via a speed reducer, connected to a wheel and drives or rotates the wheel, a steering motor that may change the direction of a wheel, and a set of steering gears that are disposed between a steering rotator that supports the wheel, the steering motor and the speed reducer. The set of steering gears converts rotation of the steering motor into the steering rotation of the wheel.

Further in another embodiment of the present invention, each of the driving operation blocks includes a driving operation panel for joystick operation, a seating rail for a driver to sit or lean, and a control circuits for the driving and steering motors.

Yet in another embodiment of the present invention, each of the seating rails is L-shaped and includes a seating bar and a rotation support rail. The seating bar is for a standing driver on an electric vehicle to sit or lean, extending along the side of the body base in the width direction. One end of the rotating support rail is connected to one side of the seating bar. The other end of the rotating support rail is supported by the driving operation block so that the rotation support rail can be rotated about an axis that is in the width direction of body base. Consequently, the seating rail supported by the rotatable support rail can be rotated upward, when it is not in use, and can be rotated downward, when it is in use.

Further, still in another embodiment of the present invention, an electric vehicle may have a collapsible flap, which bridges between the service floor and the floor of a facility or a ground surface base on either of or both of left and right sides of the service floor. The flap may be foldable and may be kept stand upward while it is not in use.

Furthermore, an embodiment of the present invention is an electric vehicle having a structure foldable at the center of the front-rear direction of the body base.

EXAMPLES

Figure 1:
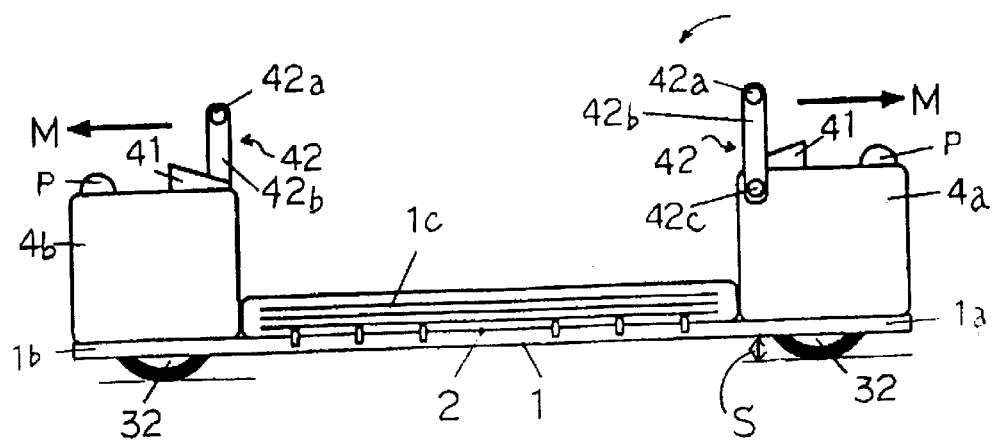
FIG. 1 is a side view of an electric vehicle showing an example of the present invention.
Figure 2:
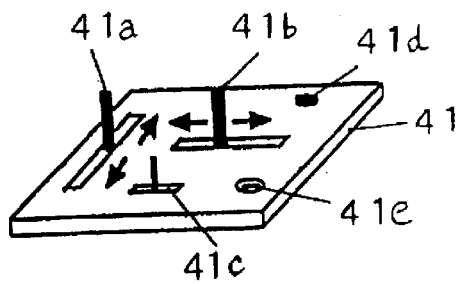
FIG. 2 is a perspective view of a driving operation panel of the electric vehicle of the present invention.
Figure 3:
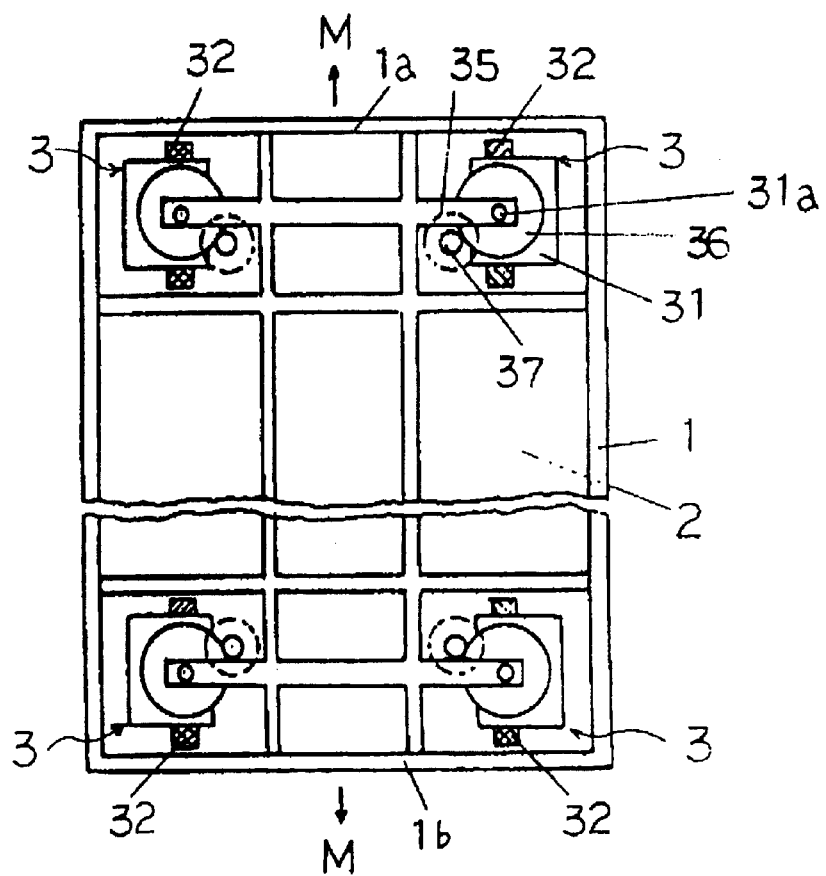
FIG. 3 is a plan view of a body base of the electric vehicle of the present invention.
Figure 4:
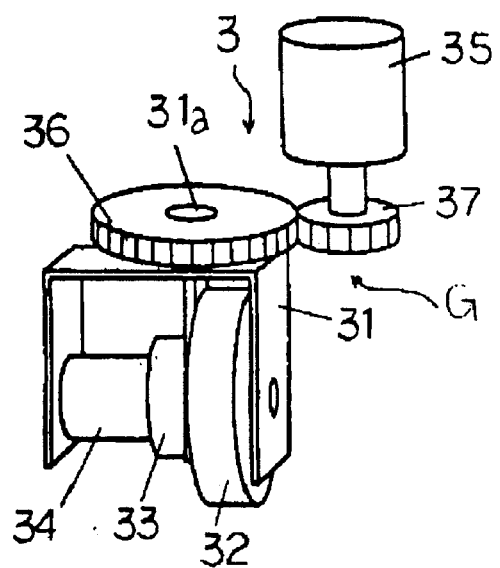
FIG. 4 is a partial perspective view of a driving and steering block of the electric vehicle of the present invention.
Figure 5:
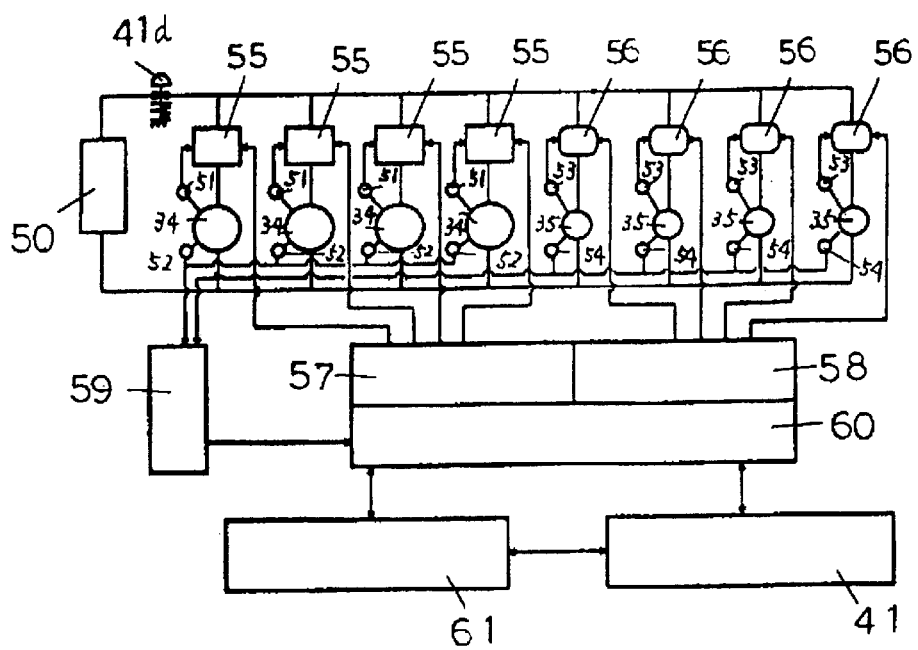
FIG. 5 is a block diagram of an electric system circuit of the electric vehicle.
Figure 6:
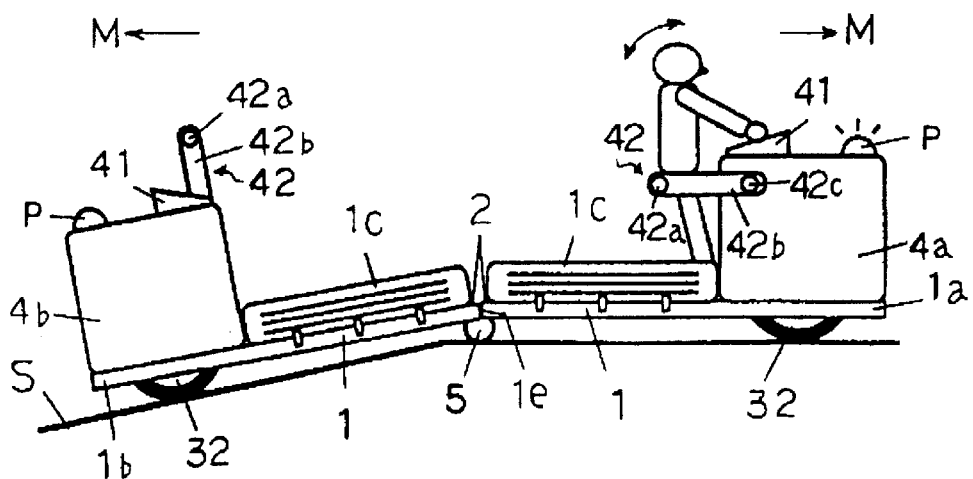
FIG. 6 is a side view of an electric vehicle showing another example.

Examples of the present invention are described using figures as follows. FIG. 1 is a side view of an electric vehicle showing an example. FIG. 2 is a perspective view of a driving operation panel of the electric vehicle. FIG. 3 is a plan view of a body base of the electric vehicle. FIG. 4 is a partial perspective view of a driving and steering block of the electric vehicle. FIG. 5 is a block diagram of an electric system circuit of the electric vehicle. FIG. 6 is a side view of an electric vehicle that shows another example.

Almost its entire surface of the rectangular body base 1 is a service floor 2. To reduce the physical load of a senior citizen or a person in a wheel chair to get on or off the vehicle, the height of the service floor 2 (the distance S between the bottom surface of the service floor and the ground floor surface) is set as low as possible. As a result of research on the conditions of aisle passageway surfaces in many medical and welfare facilities, the height S may be preferably 50 to 120 mm, more preferably 70 to 90 mm, even though the height depends on the size and weight of the electric vehicle. In this embodiment, the height was set to 80 mm. This extremely low floor height still has no adverse influence from the regular unevenness of the passageway surfaces of those facilities including surfaces at the top of slopes. Body base 1 is bare and does not have any roof or a side-wall, such as those seen on regular cars. As shown in FIG. 3, each of the four corners of the body base 1 are provided with a driving and steering block 3. As shown in FIG. 1, at both front and rear end portions 1a and 1b of the body base 1, facing in the front-rear direction, driving operation blocks 4a and 4b are provided, respectively. The driving operation blocks 4a and 4b are identical or substantially identical, or at least equal in appearance or shape.

The four driving and steering blocks 3 that are positioned at the four corners of the body base 1 are essential parts of the four-wheel independent drive and four-wheel independent steering system of the vehicle of the present invention. As shown in FIGS. 3 and 4, each of the driving and steering blocks 3 includes a wheel 32 supported by a steering rotator 31 having a 3-sided shape, a driving motor 34 that drives and rotates the wheel 32 by directly, or by means of a speed reducer 33, connected to the wheel 32, steering motor 35 that changes the direction of the wheel 32, a set of gears G that is provided between the steering rotator 31 and the steering motor 35 and converts the rotation of the steering motor 35 into the steering rotation of the wheel 32 by means of the gears. The set of gears G include a meshed link gear 36 and a pinion gear 37. The link gear 36 is fixed on the steering rotator 31, and pinion gear 37 is connected to a rotating axis of the steering motor 35. The steering rotator 31 is connected to the bottom of body base 1 via axle 31a so that it can rotate. The steering motor 35 is also fixed on body base 1. The reason why wheels 32 are operated with four-wheel independent drive and four-wheel independent operation, using the drive and steering block 3 with the above-mentioned structure, is to move the body base 1 quickly and accurately to the forward and rearward directions, variously angled diagonal directions and straight sideway directions. The controllable angles of the direction of wheels 32 is set to be preferably at least ±70 degrees relative to the front and rear direction M of body base 1.

As shown in FIGS. 1 and 2, each of the driving operation blocks 4a and 4b includes a driving operation panel 41 for joystick operation, driver seating rail 42, steering gear motor 45 that changes the direction of wheels 32, and a driving operation circuit etc. By providing driving operation blocks 4a and 4b separately at the front and rear ends 1a and 1b of the body base 1, any devices, parts or circuits which are necessary for the operation of the vehicle are enclosed therein. And any device, parts or circuits could be eliminated from the bottom side of the body base 1. Then, it became possible to enlarge the effective area of service floor 2 on body base 1, while keeping the floor height of the service floor low.

In addition, in order to enlarge the effective area of the service floor 2, a fixed driver's seat is not provided, but rather a standing driver's seat is provided. As shown in FIG.

1, the driver's seating rail 42 is rotatably supported by the driving operation block 4a or 4b. Where the seating rail 42 is not in use, it may be raised up as shown in FIG. 1, and where it is in use it may be rotated down as shown in FIG. 1 with a curved arrow so that the seating rail 42 hinders as little as possible the use of the corner portion of service floor 2. Namely, the seating rail 42 is L-shaped and contains a seating bar 42a, which extends in the width direction (which is perpendicular to the front and rear direction M) along the front or rear end side of body base 1 and a rotation support rail 42b, one end of which is connected to one end of the seating bar 42a. The other end of the support rail 42b is supported by the driving operation block 4a or 4b so that the supporting rail 42b can be rotated about an axis 42c that is perpendicular to the side of body base 1. Consequently, the seating bar 42a is supported by the rotatable supporting rail 42b so that the seating bar 42a can be rotated as shown in the curved arrow direction in FIG. 1 where the seating bar 42a is in use. A driver can lean or sit on the seating bar 42a during the operation of the electric vehicle. Where the seating bar 42a is not in use, the seating rail 42 may be raised to its standing position as shown in FIG. 1.

The reason why individual driving operation blocks 4a and 4b are located at both the front and rear ends 1a and 1b of body base 1, is because the direction of the vehicle can be changed 180 degree without making a U-turn. In addition, the driving operation blocks 4a and 4b have identical or substantially identical in at least appearance or additionally in function. They are provided symmetrically around a point on the body base 1, so that an operator of the electric vehicle at either driving operation block 4a or 4b at the front end 1a or rear end 1b feels no difference in driving either direction of the vehicle.

The driving operation panel 41 of the driving operation block 4a or 4b includes a front/back movement lever 41a, a right/left movement lever 41b, and a forward/reverse phase switch 41c, along with emergency switch 41d and key lock 41e, as shown in FIG. 2. A single-lever joystick (not shown) may be used in place of front/back movement lever 41a and the right/left movement lever 41b to achieve the same driving operation. The joystick operation is employed to make the driving operation easy and to avoid incorrect operations. The positive/negative phase switch 41c has an important function of switching the steering modes of wheels 32. For example, in the positive phase operation, a steering mode is set so that the steering direction of the front wheels and rear wheels are different, as in a regular four-wheel automobile steering while driven around a curve. In the negative phase operation, a steering mode is set to have the four wheels of the vehicle steered in the same direction so that the vehicle can be moved to any diagonal or side directions holding the body of the vehicle in parallel.

As shown in FIG. 1, in order to eliminate a step between the service floor 2 of body base 1 and an external or ground floor 1, a flap 1c is formed at either of or both of the right and left edges of body base 1. The flap 1c bridges the service floor 2 and the ground floor 1 to form a slope between them for smooth operation. The flap 1c can be collapsed or raised upward when it is not in use. A safety switch (not shown) that disconnects the power circuit of body base 1 while the flap 1 is opened may be employed. An alarm P may be mounted on the body. The alarm can be a lamp or other warning signal producing device producing light emitted towards the ceiling or floor of the facility or sound to warn existence of the vehicle.

In another embodiment of the present invention, the center portion of the body base 1 may be convexed upward to avoid the center portion touches the floor. For this purpose, the center portion of the body base 1 may be foldable and convexed at least upward along the line of width direction as shown in FIG. 6. The folding portion 1e ay be supported by a supporting wheel 5. By providing foldable structure of the body base 1, the wheels 32 do not leave the surface of the sloped passageway S when the vehicle is climbing the passageway S, even though the floor height of the service floor 2 is extremely low, while passing through passageway S with a slope having a different inclination in its peak or valley shape. The supporting wheel 5 may be structured not to touch a floor when the vehicle is traveling on a flat floor.

FIG. 5 shows an electric control circuit of the above-mentioned electric vehicle. In FIG. 5, a rechargeable battery 50 mounted on the body base 1 provides electric power to the circuit. To accurately control the drive motor 34 and the steering motor 35, and to detect a control error of the drive motor 34 and steering motor 35, the drive motor 34 is provided with a feedback rotation angle sensor 51 and a control error detection rotation angle sensor 52, and also the steering motor 35 is provided with a feedback rotation angle sensor 53 and a control error detection rotation angle sensor 54. A drive motor controller 55 is configured to control the rotation of the drive motor 34. A steering gear controller 56 is configured to control the steering motor 35. A control signal generator 57 generates control signal for controlling the drive motor 34. A control signal generator for the steering gear motor 58 generates control signal for controlling the steering motor 35. A control error monitor 59 receives signals of the control error detection rotation angle sensor 52 or 54, and indicates when an error is detected. A joystick interface transfer signals based on the operation of joysticks to the control signal generators 57 and 58.

With the above-mentioned drive control circuit, the vehicle, namely the body base 1 runs at a low speed of, such as, 7 km/h or less. When there is an abnormal condition, such that the steering gear of the four wheels 32 is not correctly functioning in accordance with the designated driving purpose, the abnormality can be detected by the steering motor control error detection sensor 54 and operation is interrupted. In addition, in order to avoid an electro-magnetic disturbance to medical electronic devices, power wires (not shown) that are connected between a power source such as a rechargeable battery and the drive motor 34 or the steering motor 35 may be twisted wires. In addition, the vehicle may make an emergency stop in the case where the vehicle comes in contact with a person or an object outside the vehicle. The vehicle may be configured to automatically stop when a driver releases his/her hands from the driving operation lever. The vehicle may have a display that indicates movement direction of the vehicle based on the current steering gear operation.

As is clear from the above-mentioned embodiment, the electric vehicle of the present invention allows the height of the service floor of the vehicle to be extremely low, and therefore, it is extremely desirable as a vehicle that support the transportation of senior citizens and people in wheel-chairs in medical and welfare facilities. The vehicle of the present invention has a greater surface area effectively used for the service floor, so that it has a high transportation efficiency of people and freight materials. In addition, the driving direction can be safely reversed without making a U-turn, by instead changing the driving position on the body base to the front or rear. Furthermore, the body base can be smoothly moved to diagonal or straight side directions in a parallel manner, so that the vehicle can be fully utilized in those places where there is no extra room in the passage space such as in an indoor hallway or in elevators in medical and welfare facilities.

The contents of Japanese Patent Application No. 2000-361127 filed Nov. 28, 2000 are incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. An electric vehicle comprising a body base, said body base further comprises:
    a service floor having no side wall;
    a plurality of driving and steering blocks, at least one comprises a wheel, a drive motor that drives and rotates the wheel, and a steering motor that changes direction of the wheel; and
    first and second driving operation blocks at first and second ends of the body base,
    wherein said first and second driving operation blocks are substantially identical at least in appearance and are provided symmetrically around a point.

2. The electric vehicle according to claim 1, the at least one of said driving and steering blocks further comprises a speed reducer that reduces rotation speed of the driving motor to rotate the wheel.

3. The electric vehicle according to claim 1, the at least one of said driving and steering blocks further comprises a steering rotator and a gear, said steering rotator comprises the wheel, wherein the steering motor changes the direction of the wheel by means of the gear and the steering rotator.

4. The electric vehicle according to claim 1, the direction of the wheel is changed at least ±70 degrees relative to a front and rear direction of the body base.

5. The electric vehicle according to claim 1, the drive motor and the steering motor are electrically connected to a battery with a twisted power wire.

6. The electric vehicle according to claim 1, wherein a height of a service floor from a ground floor is between 50 to 120 mm.

7. The electric vehicle according to claim 1, wherein a height of a service floor from a ground floor is between 70 to 90 mm.

8. An electric vehicle comprising a body base, said body base further comprises:
    a service floor having no side wall;
    a plurality of driving and steering blocks;
    a first driving operation block, provided at a first end of the body base, comprising a driving operation panel, a seating rail, and a control circuit that controls a driving motor and a steering motor; and
    a second driving operation block provided at a second end of the body base,
    wherein said first and second driving operation blocks are substantially identical at least in appearance and are provided symmetrically around a point.

9. The electric vehicle according to claim 8, the driving operation panel further comprises a lever that directs front/back movement and left/right movement of the vehicle.

10. The electric vehicle according to claim 8, the driving operation panel further comprises a switch that switches positive and negative phase steering operations.

11. The electric vehicle according to claim 8, the seating rail comprises a seating bar that extends along a side of the body base and a rotating support rail having first and second ends, the first end is connected to an end of the seating bar and the second end is connected to the first driving operation block rotatably upward and downward.

12. An electric vehicle comprising:
    a body base comprising
        a service floor having no side wall;
        a plurality of driving and steering blocks; and
        first and second driving operation blocks at first and second ends of the body base, said first and second driving operation blocks being substantially identical at least in appearance and are provided symmetrically around a point; and
    a flap that bridges a service floor and a ground floor at a side of the body base.

13. An electric vehicle comprising a body base which is convexed at least upward at a center thereof, said body base further comprises:
    a service floor having no side wall;
    a plurality of driving and steering blocks; and
    first and second driving operation blocks at first and second ends of the body base,
    wherein said first and second driving operation blocks are substantially identical at least in appearance and are provided symmetrically around a point.

14. An electric vehicle comprising a body base which is foldable at a center thereof, said body base further comprises:
    a service floor having no side wall;
    a plurality of driving and steering blocks; and
    first and second driving operation blocks at first and second ends of the body base,
    wherein said first and second driving operation blocks are substantially identical at least in appearance and are provided symmetrically around a point.

15. The electric vehicle according to claim 14, the body base further comprises a supporting wheel at the center.

16. The electric vehicle according to claim 14, the body base is convexed at least upward at the center.

* * * * *